US011634091B2

(12) United States Patent
Campbell et al.

(10) Patent No.: US 11,634,091 B2
(45) Date of Patent: Apr. 25, 2023

(54) ACOUSTIC FIBER SILENCER

(71) Applicant: Cascade Engineering, Inc., Grand Rapids, MI (US)

(72) Inventors: Michael T. Campbell, Grand Rapids, MI (US); Andrew R. Skestone, Caledonia, MI (US)

(73) Assignee: Cascade Engineering, Inc., Grand Rapids, MI (US)

( * ) Notice: Subject to any disclaimer, the term of this patent is extended or adjusted under 35 U.S.C. 154(b) by 767 days.

(21) Appl. No.: 16/492,810

(22) PCT Filed: Mar. 13, 2018

(86) PCT No.: PCT/US2018/022121
§ 371 (c)(1),
(2) Date: Sep. 10, 2019

(87) PCT Pub. No.: WO2018/187000
PCT Pub. Date: Oct. 11, 2018

(65) Prior Publication Data
US 2021/0046886 A1    Feb. 18, 2021

Related U.S. Application Data

(60) Provisional application No. 62/480,724, filed on Apr. 3, 2017.

(51) Int. Cl.
*B60R 13/08* (2006.01)
*B32B 3/24* (2006.01)
(Continued)

(52) U.S. Cl.
CPC ............ *B60R 13/0815* (2013.01); *B32B 3/08* (2013.01); *B32B 3/266* (2013.01); *B32B 3/30* (2013.01);
(Continued)

(58) Field of Classification Search
None
See application file for complete search history.

(56) References Cited

U.S. PATENT DOCUMENTS 2,113,128 A    4/1938 Cunnington
2,116,771 A *  5/1938 Seaman .................... E04B 1/86
                                                      181/290
(Continued)

FOREIGN PATENT DOCUMENTS

CN    202429144 U  *  9/2012
CN    204726351       10/2015
(Continued)

OTHER PUBLICATIONS

Machine Translation of RU-2369495-C2, Oct. 2009 (Year: 2009).*
(Continued)

*Primary Examiner* — Jeffrey A Vonch
(74) *Attorney, Agent, or Firm* — Warner Norcross + Judd LLP (57) ABSTRACT

An acoustic fiber silencer for a motor vehicle includes a first sound absorbing layer and a second sound insulating layer. The layers are formed of lightweight fibrous material, and the sound insulating layer is quilted. The acoustic fiber silencer includes a frame to which the sound absorbing and sound insulating layers are secured. The frame provides structural support and shape to the sound absorbing and sound insulating layers. The acoustic fiber silencer is lightweight while maintaining excellent noise attenuation properties.

17 Claims, 9 Drawing Sheets

(51) Int. Cl.
  *B32B 3/30* (2006.01)
  *B32B 5/02* (2006.01)
  *B32B 5/24* (2006.01)
  *B32B 5/26* (2006.01)
  *B32B 27/12* (2006.01)
  *B32B 38/06* (2006.01)
  *G10K 11/168* (2006.01)
  *B32B 5/06* (2006.01)
  *B32B 3/26* (2006.01)
  *B32B 3/08* (2006.01)
  *B32B 5/14* (2006.01)
  *B32B 7/09* (2019.01)
  *B32B 5/08* (2006.01)
  *B32B 5/22* (2006.01)

(52) U.S. Cl.
  CPC .............. *B32B 5/022* (2013.01); *B32B 5/06* (2013.01); *B32B 5/142* (2013.01); *B32B 5/24* (2013.01); *B32B 5/26* (2013.01); *B32B 5/266* (2021.05); *B32B 27/12* (2013.01); *B60R 13/08* (2013.01); *G10K 11/168* (2013.01); *B32B 5/02* (2013.01); *B32B 5/073* (2021.05); *B32B 5/08* (2013.01); *B32B 5/22* (2013.01); *B32B 5/245* (2013.01); *B32B 7/09* (2019.01); *B32B 38/06* (2013.01); *B32B 2250/02* (2013.01); *B32B 2250/03* (2013.01); *B32B 2250/04* (2013.01); *B32B 2250/20* (2013.01); *B32B 2262/0253* (2013.01); *B32B 2262/0284* (2013.01); *B32B 2262/062* (2013.01); *B32B 2262/14* (2013.01); *B32B 2266/0214* (2013.01); *B32B 2307/102* (2013.01); *B32B 2307/724* (2013.01); *B32B 2605/003* (2013.01); *B32B 2605/08* (2013.01); *B60Y 2306/09* (2013.01); *Y10T 428/2476* (2015.01); *Y10T 428/24322* (2015.01); *Y10T 428/24603* (2015.01); *Y10T 428/24612* (2015.01); *Y10T 428/24942* (2015.01); *Y10T 442/647* (2015.04); *Y10T 442/659* (2015.04); *Y10T 442/674* (2015.04)

(56) References Cited

U.S. PATENT DOCUMENTS

| | | | | |
|---|---|---|---|---|
| 4,043,022 A * | 8/1977 | Kisuna | B32B 3/30 | 428/903.3 |
| 4,213,516 A * | 7/1980 | Sulewsky | E04B 1/8409 | 428/156 |
| 4,242,398 A * | 12/1980 | Segawa | B32B 5/26 | 428/218 |
| 4,420,526 A * | 12/1983 | Schilling | G10K 11/162 | 428/156 |
| 4,539,252 A * | 9/1985 | Franz | E04C 2/246 | 428/920 |
| 4,966,799 A * | 10/1990 | Lucca | B32B 7/12 | 181/290 |
| 5,298,694 A | 3/1994 | Thompson et al. | | |
| 5,509,247 A * | 4/1996 | Fortez | B60R 13/0225 | 52/630 |
| 5,557,078 A * | 9/1996 | Holwerda | B60R 13/0846 | 181/208 |
| 5,773,375 A | 6/1998 | Swan et al. | | |
| 5,817,408 A * | 10/1998 | Orimo | B32B 7/022 | 428/218 |
| 5,831,225 A | 11/1998 | Campbell | | |
| 5,897,935 A | 4/1999 | Ellis et al. | | |
| 5,975,609 A | 11/1999 | Campbell | | |
| 6,024,190 A | 2/2000 | Ritzema | | |
| 6,089,349 A | 7/2000 | Aye | | |
| 6,092,622 A * | 7/2000 | Hiers | G10K 11/162 | 181/290 |
| 6,092,854 A | 7/2000 | Campbell | | |
| 6,136,415 A | 10/2000 | Spengler | | |
| 6,145,617 A * | 11/2000 | Alts | B32B 5/22 | 181/290 |
| 6,720,068 B1 | 4/2004 | Vanbemmel et al. | | |
| 6,971,475 B2 | 12/2005 | Tompson et al. | | |
| 7,182,172 B2 | 2/2007 | Albin, Jr. | | |
| 7,322,440 B2 | 1/2008 | Khan et al. | | |
| 7,837,009 B2 | 11/2010 | Gross et al. | | |
| 7,918,313 B2 | 4/2011 | Gross et al. | | |
| 7,980,358 B2 | 7/2011 | Soltau et al. | | |
| 8,637,145 B2 | 1/2014 | Inoue et al. | | |
| 9,415,728 B2 | 8/2016 | Kim | | |
| 2003/0008581 A1 * | 1/2003 | Tilton | B29C 43/203 | 156/196 |
| 2003/0066708 A1 * | 4/2003 | Allison | G10K 11/168 | 181/290 |
| 2003/0124314 A1 * | 7/2003 | Michael | B32B 3/28 | 428/141 |
| 2003/0224145 A1 * | 12/2003 | Campion | D04H 1/72 | 264/172.19 |
| 2004/0055813 A1 * | 3/2004 | Tsuiki | B60R 13/0815 | 181/204 |
| 2004/0075290 A1 * | 4/2004 | Campbell | B60R 13/083 | 296/39.3 |
| 2004/0079583 A1 * | 4/2004 | Allison | B32B 27/304 | 181/290 |
| 2004/0129493 A1 | 7/2004 | Campbell | | |
| 2004/0256175 A1 * | 12/2004 | Gnadig | B32B 5/245 | 181/290 |
| 2005/0006173 A1 * | 1/2005 | Albin | D04H 1/74 | 181/290 |
| 2005/0126848 A1 | 6/2005 | Siavoshai et al. | | |
| 2005/0191921 A1 * | 9/2005 | Tilton | B32B 5/14 | 442/60 |
| 2006/0128246 A1 * | 6/2006 | Anderegg | D04H 1/43838 | 442/400 |
| 2006/0225952 A1 * | 10/2006 | Takayasu | G10K 11/162 | 181/294 |
| 2006/0254855 A1 * | 11/2006 | Loftus | E04B 1/84 | 181/293 |
| 2006/0289230 A1 * | 12/2006 | Connelly | B60R 13/08 | 181/290 |
| 2007/0065644 A1 * | 3/2007 | Blomeling | B29C 43/52 | 264/324 |
| 2007/0144829 A1 * | 6/2007 | Ishikawa | G10K 11/162 | 181/204 |
| 2007/0154682 A1 * | 7/2007 | Connelly | B60R 13/083 | 428/167 |
| 2008/0017445 A1 | 1/2008 | Katz | | |
| 2008/0067002 A1 * | 3/2008 | Pfaffelhuber | B60R 13/0884 | 181/290 |
| 2008/0099278 A1 * | 5/2008 | Simon | B60R 13/0815 | 181/293 |
| 2010/0065368 A1 | 3/2010 | Tazian | | |
| 2010/0066121 A1 * | 3/2010 | Gross | G10K 11/162 | 442/364 |
| 2010/0320030 A1 * | 12/2010 | Ogawa | B32B 5/022 | 181/294 |
| 2011/0226547 A1 * | 9/2011 | Kuhl | B32B 5/12 | 181/294 |
| 2011/0254307 A1 * | 10/2011 | Castagnetti | G10K 11/168 | 296/39.3 |
| 2011/0284319 A1 * | 11/2011 | Frederick | E04B 1/86 | 181/294 |
| 2014/0014438 A1 * | 1/2014 | Bertolini | G10K 11/002 | 181/290 |
| 2014/0265413 A1 * | 9/2014 | Demo | B60R 13/0815 | 181/290 |
| 2015/0315781 A1 * | 11/2015 | Kang | B29C 59/04 | 264/293 |
| 2016/0129855 A1 * | 5/2016 | Check | B32B 3/266 | 181/290 |
| 2017/0011729 A1 | 1/2017 | Lee et al. | | |
| 2018/0072026 A1 * | 3/2018 | Lemaire | B32B 1/00 | |

(56) References Cited

U.S. PATENT DOCUMENTS

2018/0345881 A1* 12/2018 Boyina ................. B21D 22/02
2019/0259365 A1*  8/2019 Scheinhardt ........... B32B 5/022

FOREIGN PATENT DOCUMENTS

| CN | 105644462 | | | 6/2016 | |
|---|---|---|---|---|---|
| CN | 205440222 | | | 8/2016 | |
| EP | 640951 | A2 | * | 3/1995 | ........... B32B 27/065 |
| EP | 1847419 | A1 | * | 10/2007 | ............. B60R 13/08 |
| FR | 2870160 | A1 | * | 11/2005 | ............ G10K 11/165 |
| FR | 2908550 | A1 | * | 5/2008 | ............ B60R 13/083 |
| JP | 57041229 | A | * | 3/1982 | |
| JP | 58174042 | A | * | 10/1983 | |
| JP | 59006150 | A | * | 1/1984 | |
| JP | 01148860 | A | * | 6/1989 | |
| JP | 04123949 | A | * | 4/1992 | |
| JP | 06075579 | A | * | 3/1994 | |
| JP | 08026045 | A | * | 1/1996 | |
| JP | 10207469 | A | * | 8/1998 | |
| JP | 11202873 | A | * | 7/1999 | |
| JP | 2000347670 | A | * | 12/2000 | ........... B32B 27/065 |
| JP | 2005075012 | A | * | 3/2005 | |
| JP | 2005246952 | A | * | 9/2005 | |
| JP | 2007509816 | | | 4/2007 | |
| JP | 2007519556 | | | 7/2007 | |
| JP | 2014016411 | A | * | 1/2014 | |
| JP | 2015209206 | | | 11/2015 | |
| KR | 100562798 | | | 3/2006 | |
| RU | 2369495 | C2 | * | 10/2009 | |
| WO | 2005079285 | | | 9/2005 | |
| WO | 2010017254 | | | 2/2010 | |

OTHER PUBLICATIONS

PCT/US2018/022121 International Search Report and Written Opinion dated May 29, 2018.
Duval et al, Generalized Light-Weight Concepts: Improving the Acoustic Performance of Less than 2500 g/m2 Insulators (2009-01-2136), Copyright 2009 SAE International, 10 pages.

* cited by examiner

ACOUSTIC FIBER SILENCER

BACKGROUND OF THE INVENTION

The present invention relates to sound insulation for vehicles, also known as dash silencers and dash insulators.

It has become common practice in the automotive industry to position an acoustic insulator adjacent a body panel, such as a firewall to provide sound insulation. The acoustic insulator, sometimes referred to as a dash silencer or a dash insulator, reduces the amount of sound entering the passenger compartment, such as from the engine compartment. Typical vehicle acoustic insulators include a noise barrier panel made of self-supporting, thermoset and/or thermoplastic materials and an acoustic absorber that typically includes a fibrous mat or foam panel. The absorptive panel is fixed to the barrier panel to provide a sound insulating system that can be installed as a unitary assembly.

A common material used in automotive acoustic insulators is "cotton shoddy." Cotton shoddy is a fiber mat made from various recycled fibers obtained from different sources. These fibers are blended with a low melt temperature bi-component polyester fiber. The bi-component fibers allow the mat to be formed in a mold and to retain the shape of the mold after cooling. The modified cotton shoddy is compressed when molded. This makes the mat denser and stiffer and helps the acoustic insulator to maintain its molded shape. Because cotton shoddy must be compressed to maintain its shape, the initial material thickness required is greater than the final acoustic barrier thickness, thus more material is used than is otherwise needed. Though cotton shoddy is rather inexpensive, the cost of the bi-component fiber and extra density required increase the cost and weight of the insulator. Other relatively low density sound absorbing layers may include flexible fibrous materials, such as nonwoven polyethylene terephthalate (PET), or polypropylene fiber mat. Although these fibers are excellent absorbers, their cost makes them less practical for molding due to the increased cost of the insulator over than that of molded cotton shoddy.

As vehicle fuel economy requirements increase, automotive manufacturers require weight savings throughout the vehicle, including weight savings in the acoustic insulator. Naturally, this has forced acoustic insulator suppliers to investigate lighter weight materials. Using a cotton shoddy insulator without a barrier is one solution that is frequently used since compression molded cotton shoddy is heavier than other absorbers. However, a common trade-off of using lighter weight materials is a reduction in the sound insulating performance.

A challenge is presented when attempting to achieve better noise attenuation properties while providing a lighter weight acoustic insulator. A further challenge includes providing a lightweight solution that can be readily installed into a vehicle.

SUMMARY OF THE INVENTION

The noted problems are addressed by the present invention.

In one embodiment, the acoustic fiber silencer includes a first sound absorbing layer and a second sound insulator layer. The layers are formed of a lightweight fibrous material and the second sound insulator layer is quilted. The acoustic fiber silencer also includes a frame to which the sound absorbing and sound insulating layers are secured. The frame provides structural support and shape to the sound absorbing and sound insulating layers.

In another embodiment, the second layer may include first and second portions. The first portions are quilted, thus increasing the air flow resistivity of the material. This provides primarily sound obstruction. The second portions are unquilted to provide primarily sound absorption.

In yet another embodiment, the frame includes barrier portions that provide additional sound obstruction.

These and other features and advantages of the invention will be more fully understood and appreciated by reference to the entire application including the specification, the claims, and the drawings.

DESCRIPTION OF THE CURRENT EMBODIMENTS

An acoustic fiber silencer 10 positioned on a generally conventional firewall that separates an engine compartment from a passenger compartment of a vehicle in accordance with one embodiment is illustrated in FIGS. 1-5. A typical vehicle firewall is an irregularly shaped panel including holes or cutouts for electrical and mechanical control lines, steering mechanisms, heating and cooling conduits, and the like. The sound penetrating a firewall will be dependent upon such variables as the shape and thickness of the firewall, the number and location of cutouts, and the proximity of sound sources to the firewall. The configuration of an acoustic insulator must take into account such varying factors.

Figure 1:
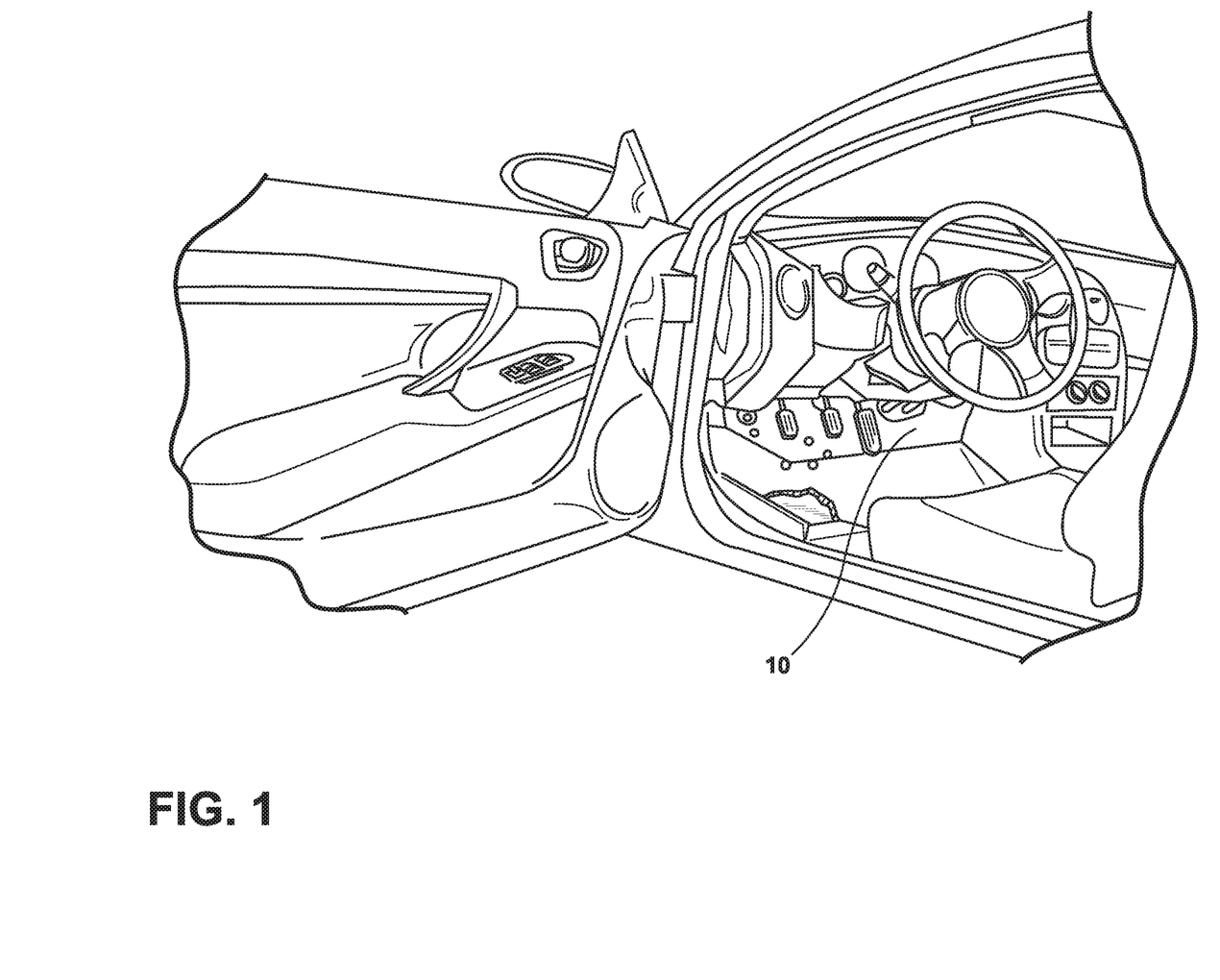
FIG. 1 is a perspective view of a portion of the interior of the passenger compartment of a motor vehicle including an acoustic fiber silencer.

FIG. 1 illustrates a portion of the interior of the passenger compartment of a motor vehicle of a generally conventional configuration including an instrument panel, a seat, a steering column, a firewall, a floor, and climate control lines for providing heating and cooling of the passenger compartment. The firewall separates the engine compartment from the passenger compartment in a generally well-known manner. A lightweight acoustic fiber silencer 10 according to one embodiment overlays the firewall and perhaps a portion of the floor. The acoustic fiber silencer 10 is generally located immediately adjacent the firewall. Alternatively, there may be an air gap provided between the acoustic fiber silencer 10 and the firewall. The acoustic fiber silencer 10 can also take forms other than the dash insulator, for example, an acoustic door panel or a rear wheel house liner and can be attached to respective supporting structure for these panels.

Figure 2:
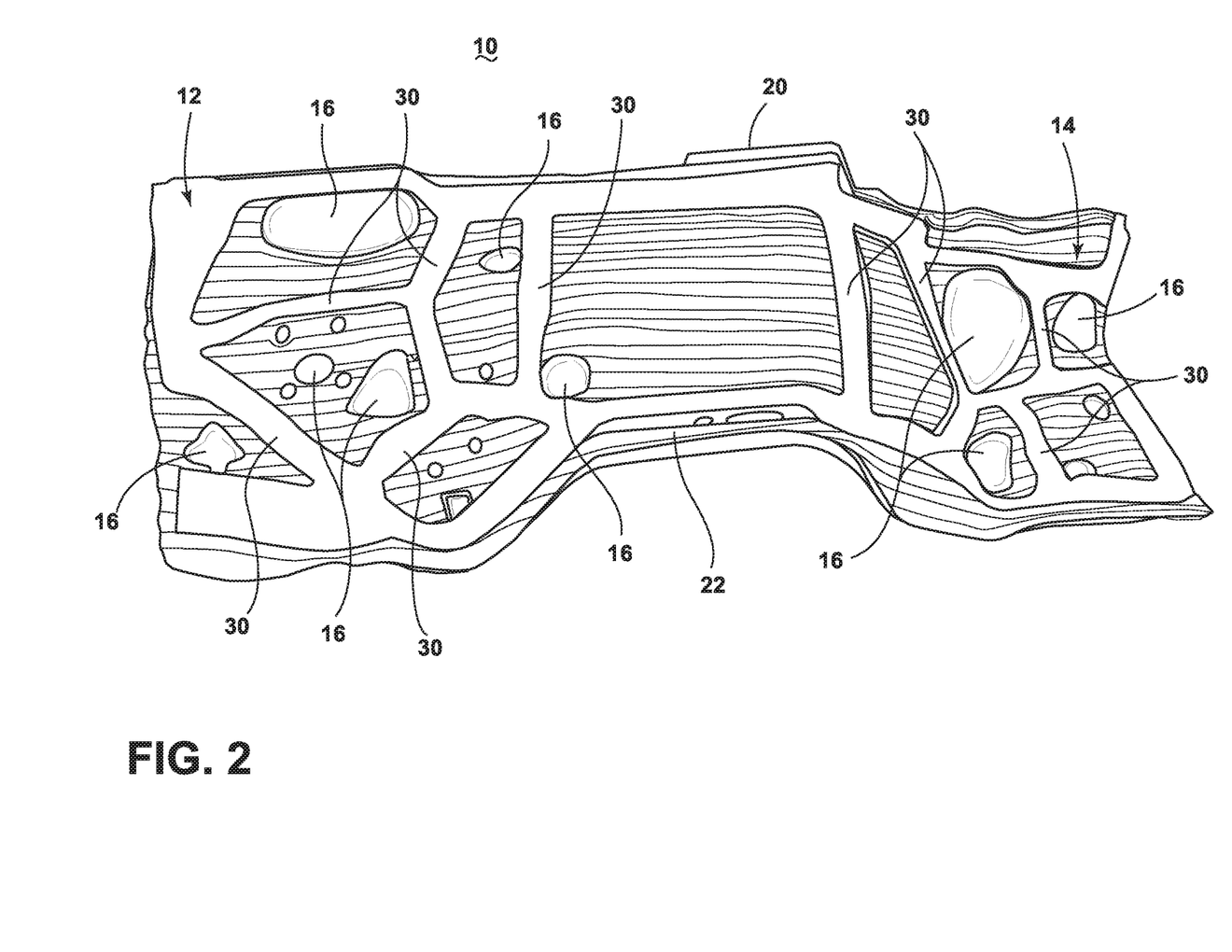
FIG. 2 is a perspective view of the acoustic fiber silencer according to a first embodiment of the present invention.
Figure 3:
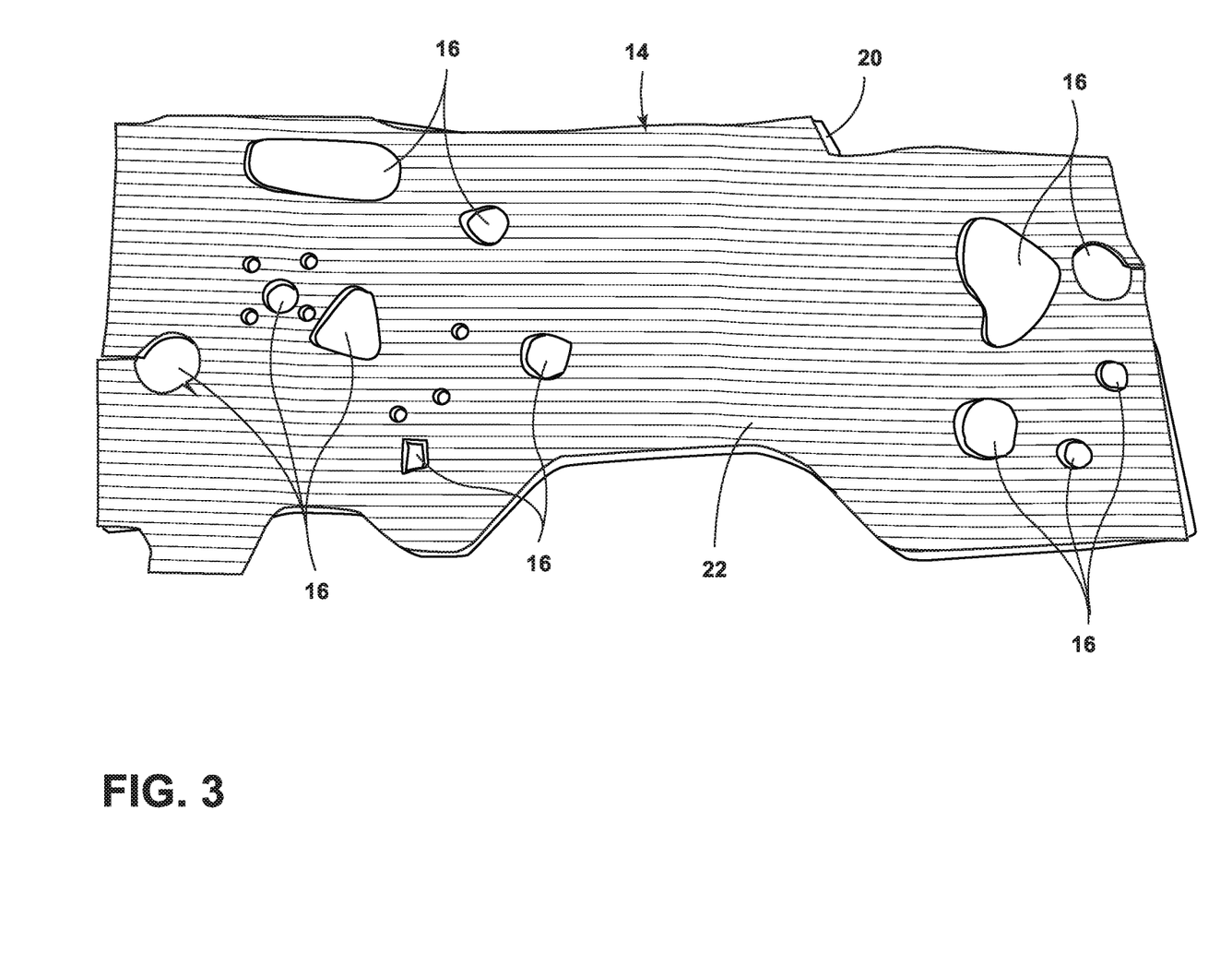
FIG. 3 is a plan view of a fiber layer of the acoustic fiber silencer.

Referring now to FIG. 2, the acoustic fiber silencer 10 is an irregularly-shaped panel including a frame 12 and a fiber layer 14. The acoustic fiber silencer 10 is provided with a plurality of cutouts 16 for passage of operational components between the engine compartment and the passenger compartment, such as a steering column cutout for passage of the steering column and a climate control line cutout for passage of the climate control lines, etc. The cutouts 16 are cooperatively aligned with openings in the firewall or the floor, to which the fiber silencer 10 is mounted.

The fiber layer 14 may include multiple layers of fibrous material. For example, the layers may be in the form of fibrous batting or mats made of polyethylene terephthalate (PET), polypropylene (PP), or a combination of both. The layers are made of a uniform material, the fibers of which have a consistent fiber diameter. Further, the fiber layer 14 can be die-cut to produce the pattern of cutouts 16 needed for passage of components from the engine compartment to the passenger compartment.

In one embodiment, the fiber layer 14 includes a first sound absorbing layer 20 and a second sound insulating layer 22. The first sound absorbing layer 20 and the second sound insulating layer 22 can each be provided at a selected thickness determined to meet the sound absorption and obstruction requirements. The first sound absorbing layer 20 is configured to primarily provide sound absorption properties and is preferably disposed in the vehicle adjacent the firewall, though an air gap may be included between the sound absorbing layer 20 and the firewall. The particular material and thickness of the sound absorbing layer 20 are selected to provide desired sound absorbing characteristics.

The second sound insulating layer 22 is configured to primarily provide sound obstruction properties and is preferably disposed between the sound absorbing layer 20 and the passenger compartment. Further, the sound insulating layer 22 can be quilted. The quilting process may be integral with the die-cutting process. The particular material and thickness of the sound insulating layer 22 are selected to provide desired sound insulating/obstruction characteristics. Further, adding quilting increases the air flow resistivity of the layer 22, which increases sound obstruction properties of the layer 22. Generally, the greater the air flow resistivity of a layer, the greater the sound obstruction properties of said layer. It should also be understood that the sound insulating layer 22, given its fibrous material makeup, will have, to at least some degree, both sound obstruction and sound absorption properties.

Figure 7:
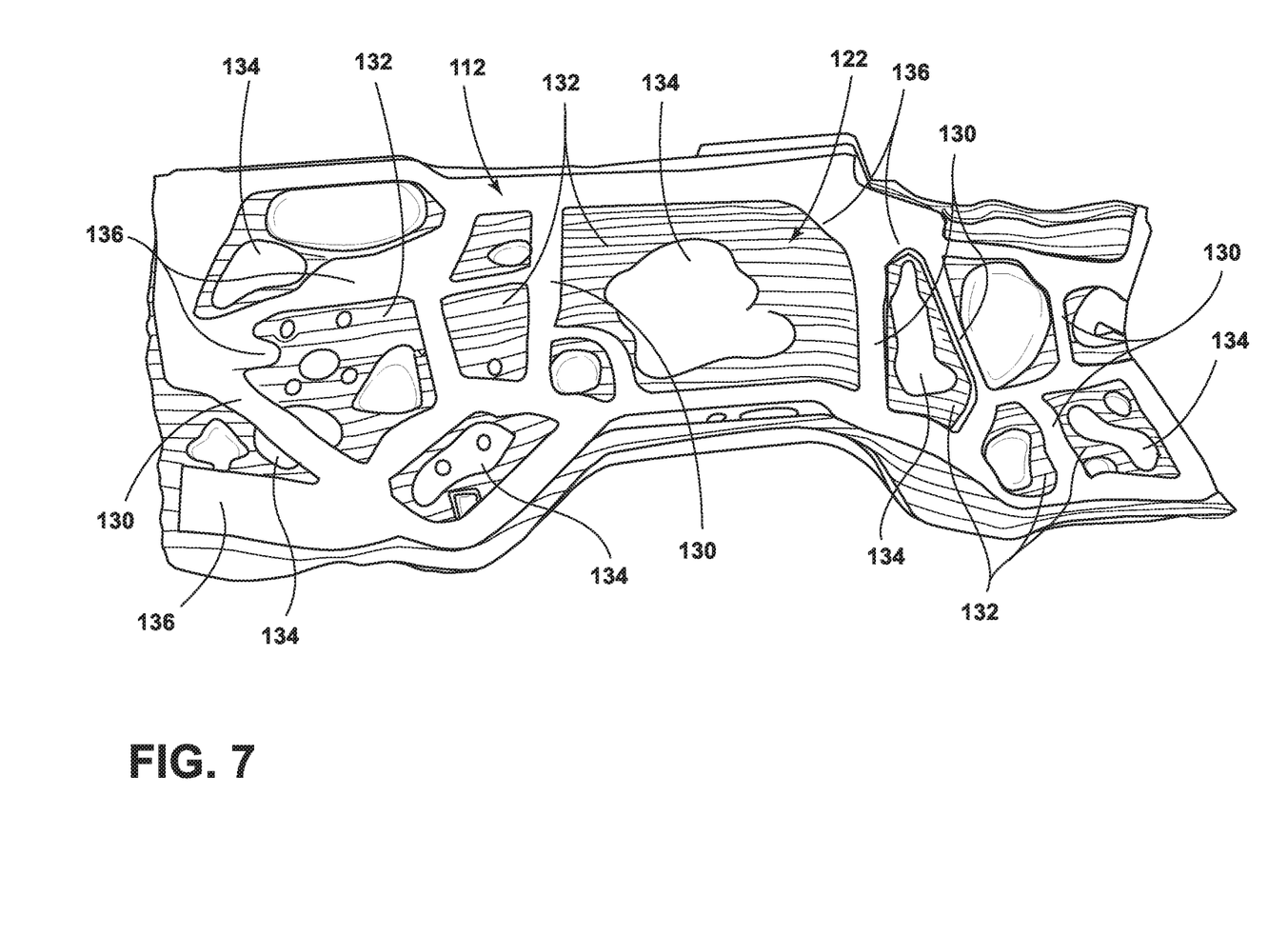
FIG. 7 is a perspective view of an acoustic fiber silencer according to a third embodiment of the present invention.
Figure 8:
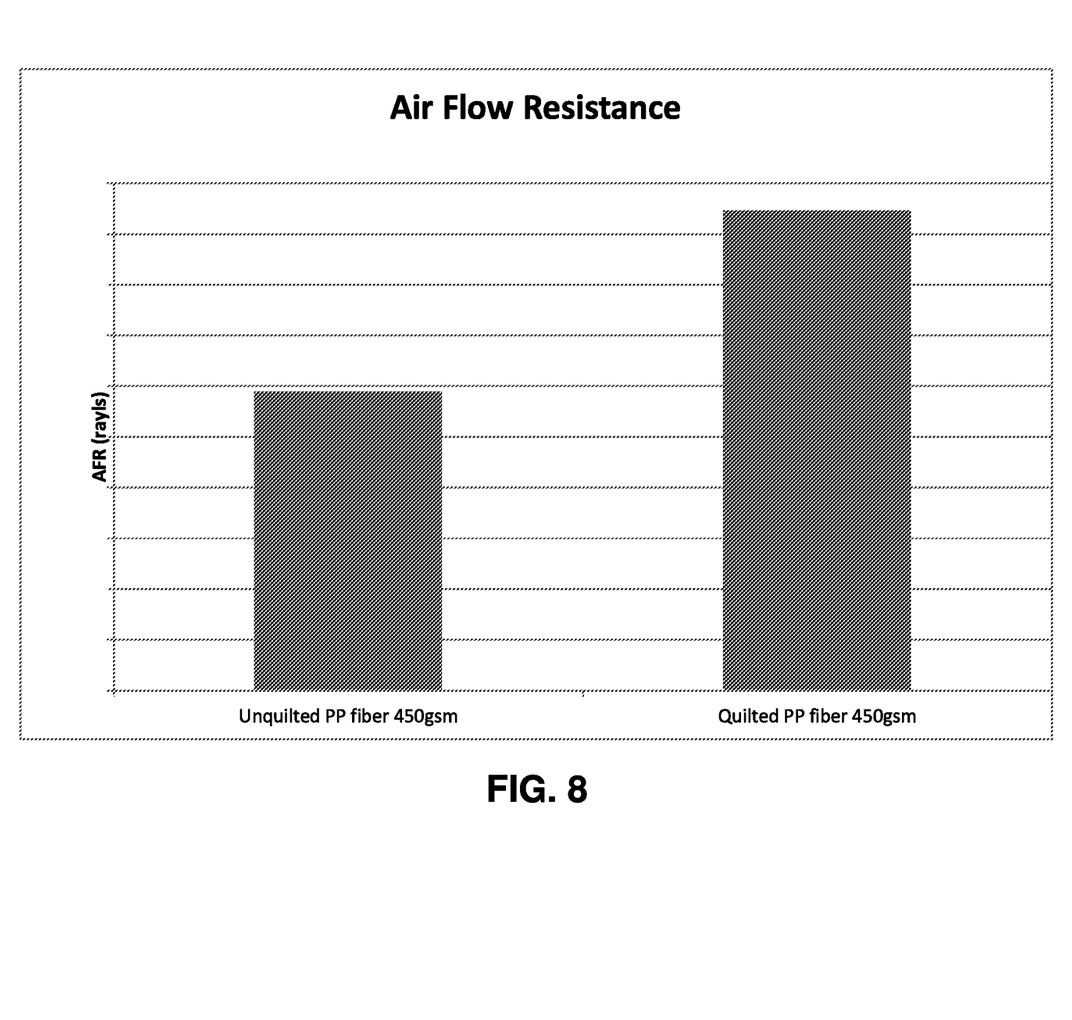
FIG. 8 is a graph showing the effect on air flow resistance when quilting a fiber layer.
Figure 9:
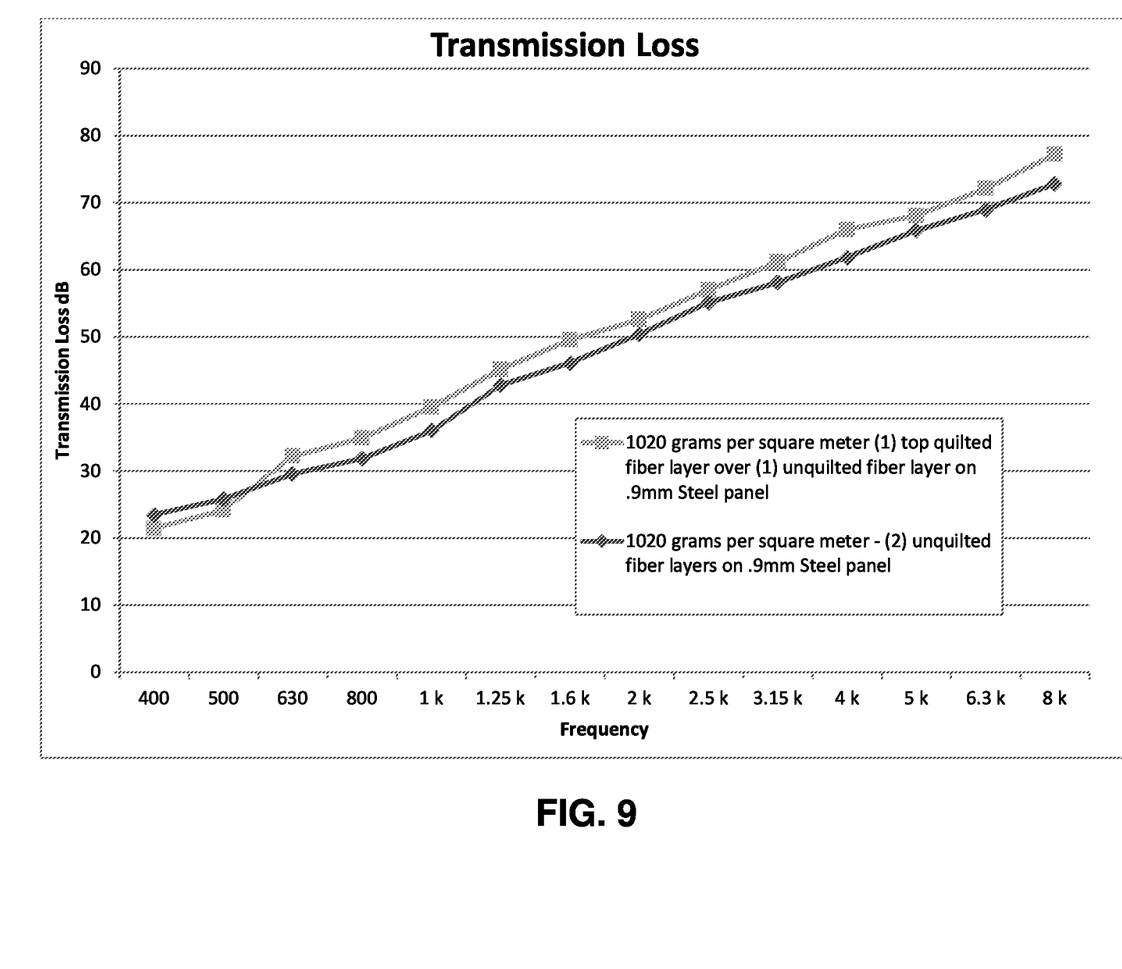
FIG. 9 is a graph showing the effect on transmission loss when quilting a fiber layer.

The graph illustrated in FIG. 7 depicts the effect of quilting on air flow resistivity. As a non-limiting example, adding quilting to the sound insulating layer 22 can increase the air flow resistance of the acoustic fiber silencer 10 by as much as 60%. As mentioned above, the increased air flow resistance also increases the sound obstruction provided by the layer 22. The graph illustrated in FIG. 8 depicts the resulting improvement in transmission loss attributed to quilting. Although not as drastic, adding quilting to the layer 22 can also increase the transmission loss through the acoustic fiber silencer 10.

The fiber layer 22 is generally quilted by passing the material through rollers where steel discs protruding from the roller pinch the fiber layer 22 with pressure and/or heat to seal the fibers together in a linear pattern. This would generally be done before die-cutting the cutouts 16 and perimeter shape of the fiber layer 22. The discs can be spaced closer together or further apart to adjust the thickness of the resulting quilt layer. Alternatively, quilting can be performed by adding steel rule to the cutting die. The steel rule is not sharp enough to cut the fiber layer 22, but would compress it with pressure, heat, or both. In either case, the quilting process adds little or no cost to the end product and allows for much lighter, higher absorption fiber layers to be used. The process of quilting the sound insulating layer 22 brings the fibers of the material into closer proximity to each other, making the sound path through the layer more tortuous, thereby increasing the sound obstruction (barrier) properties of the layer. In the example illustrated in FIGS. 2 and 3, the sound insulating layer 22 is uniformly quilted in a horizontal pattern across the entire layer. Of course, it should be understood that quilting could be included on the sound insulating layer in patterns other than horizontal.

Figure 4:
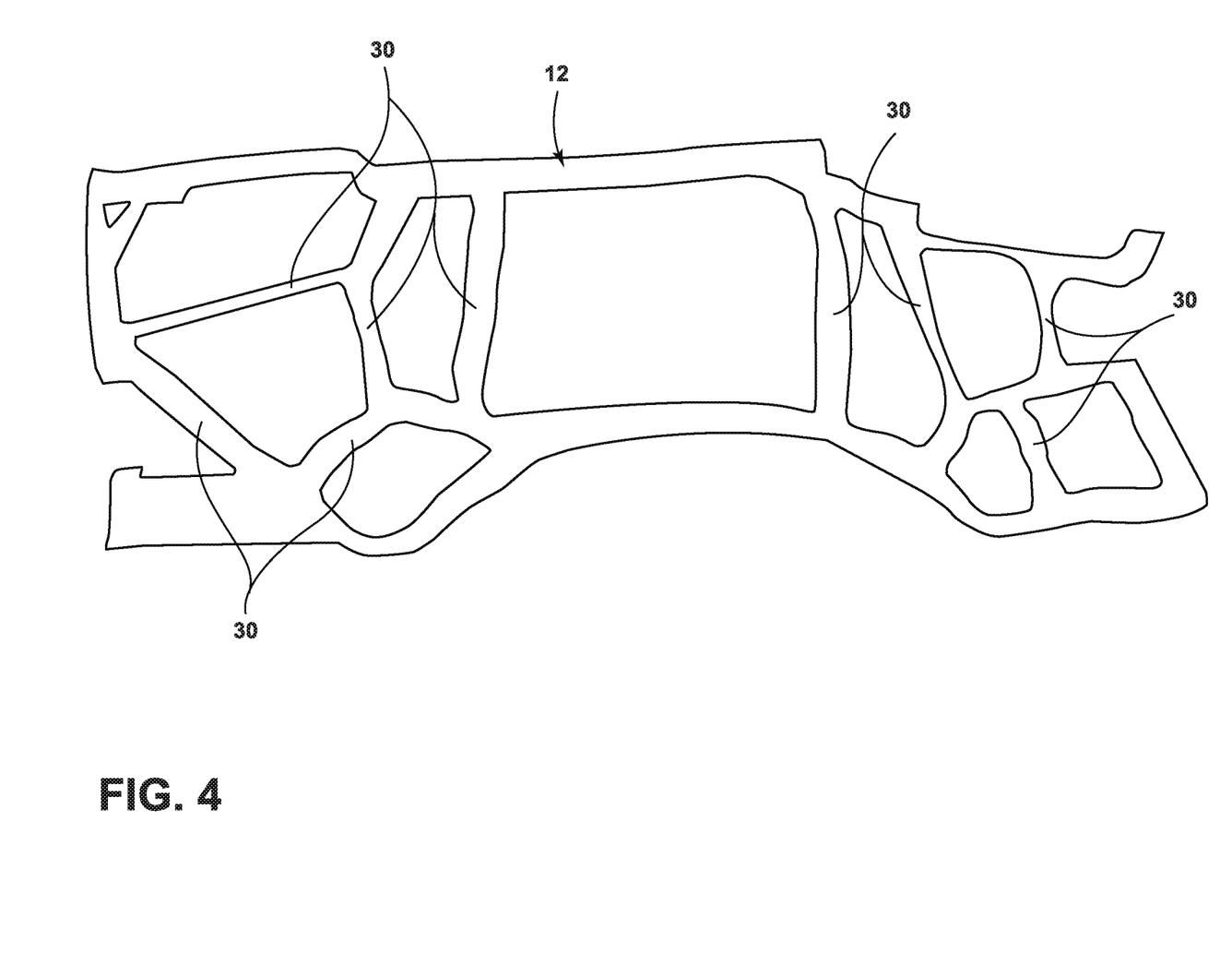
FIG. 4 is a plan view of a frame of the acoustic fiber silencer.
Figure 5:
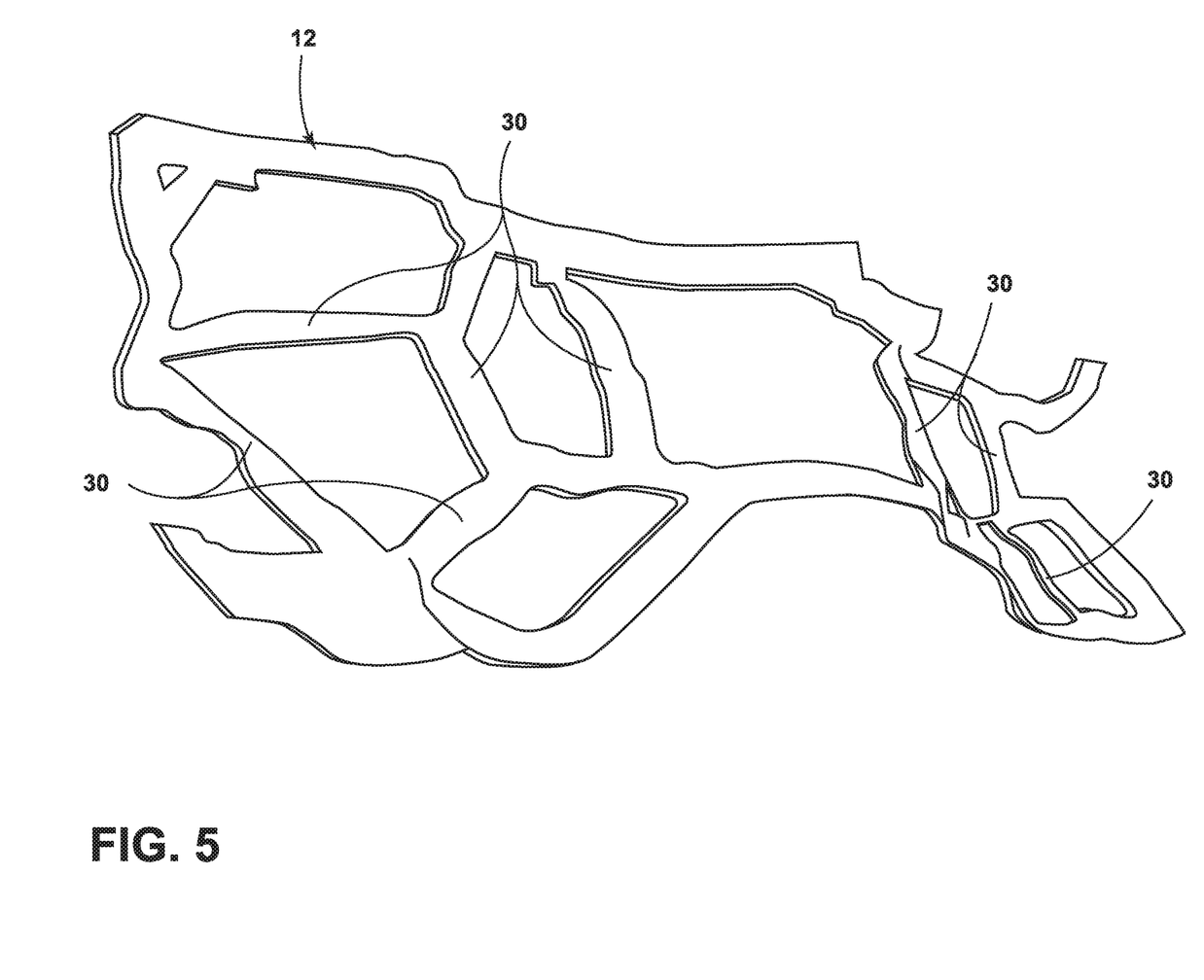
FIG. 5 is a perspective view of the frame.

Referring now to FIGS. 4-5, an example of the frame 12 is illustrated. The frame 12 is an irregularly-shaped structure configured to provide both structural support and three-dimensional shape for the fiber layer 14. The sound absorbing and sound insulating layers 20 and 22 are secured to the frame 12 because these layers are not rigid enough on their own to hold a three dimensional shape. The three-dimensional shape of the frame 12 is designed to provide the proper offset and/or contact of the acoustic fiber silencer 10 within the space adjacent the vehicle firewall. The layers 20 and 22 may be secured to the frame 12 with adhesives and/or mechanical fasteners.

The frame 12 is lightweight yet sufficiently rigid to maintain the integrity of the acoustic fiber silencer 10 during handling, shipping, and installation into the vehicle. Additionally, the frame 12 may include interior cross-members 30 which provide additional support to help achieve the desired shape and structural rigidity. Cross-members 30 are provided in an irregular pattern at locations and directions that have been determined to require additional support. The illustrated cross-members are exemplary; it should be understood that more or fewer cross-members could be included on the frame, and at different locations. Further, the frame 12 can be injection molded or formed using any other suitable manufacturing method.

Optionally, a third sound absorbing layer may be included with the fiber layer 14. The additional sound absorbing layer may be formed of a fibrous batt such as polypropylene, PET, cotton shoddy, or other insulating materials that are commonly employed as sound absorbers in acoustic insulator assemblies. Other sound absorbing layers may be foamed plastic material, flexible fibrous materials, or other relatively low density, porous sound-absorbing material commonly employed to absorb sound. The third layer may be included on either side of the first and second layers, or between the first and second layers. Of course, it should be understood that additional layers may also be included.

Unlike the relatively heavy conventional vehicle acoustic insulators, the present acoustic fiber silencer 10 is relatively lightweight. It has been found that reduced weight of the acoustic fiber silencer may be achieved while maintaining an effective acoustic performance by including two lightweight fibrous mat layers, one layer being quilted, mounted to a lightweight frame.

Figure 6:
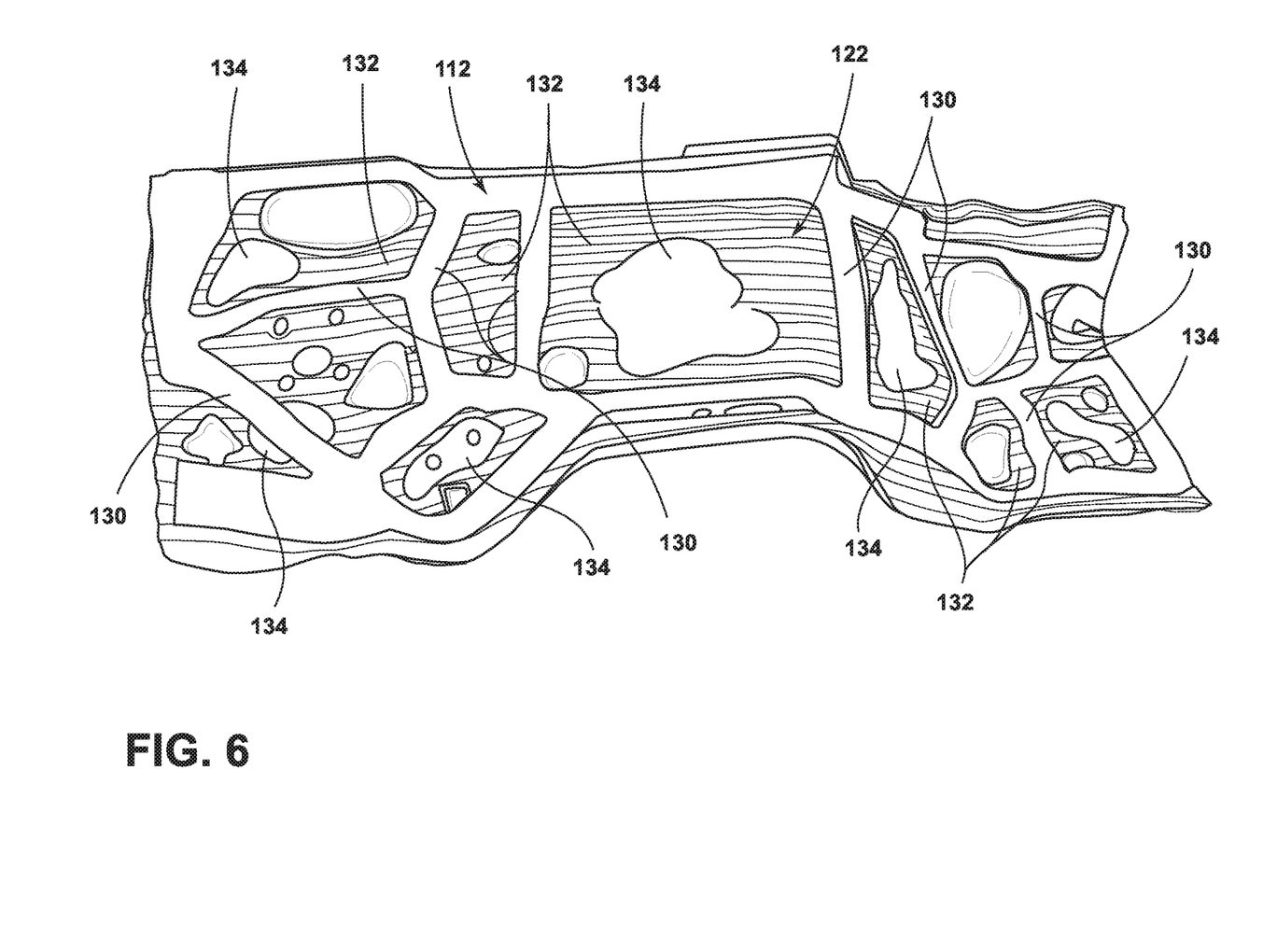
FIG. 6 is a perspective view of an acoustic fiber silencer according to a second embodiment of the present invention.

An embodiment shown in FIG. 6 eliminates quilting of the sound insulating layer 122 in areas where vehicle noise transmission levels have been determined to be low and less sound obstruction is needed. In those areas where noise levels are relatively low, the acoustic fiber silencer may include only sound absorptive layers. The sound insulating layer 122 includes first and second portions 132 and 134. The first portions 132 are quilted to provide primarily sound obstruction and the second portions 134 are unquilted to provide primarily sound absorption. The areas of the unquilted second portion 134 therefore include two absorptive layers; the first layer being the sound absorbing layer 20 and the second layer being the unquilted second portion 134 of the sound insulator layer 122. Conventional acoustic testing equipment and methods may be utilized to determine those areas of the sound insulator layer 122 where quilting may be eliminated without significant detriment to acoustic performance.

In another embodiment, illustrated in FIG. 7, the frame 112 includes barrier portions 136 that provide sound obstruction for the areas where vehicle noise transmission levels are high and additional sound obstruction is needed. In those areas where noise levels are relatively high, the acoustic fiber silencer may include two sound absorptive layers (the first layer being the sound absorbing layer 20 and the second layer being the unquilted second portion 134 of the sound insulating layer 122) and the barrier portions 136 of the frame 112.

The above descriptions are those of current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The invention claimed is:

1. An acoustic fiber silencer for a motor vehicle, the acoustic fiber silencer comprising:
   a sound absorbing layer of a fibrous material;
   a sound insulating layer of a fibrous material, the sound insulating layer comprising at least one first portion and a plurality of second portions located inward from a periphery of the first portion, the at least one first portion being quilted via pinching the fibrous material via pressure and/or heat in pattern to increase air flow resistivity and provide primarily sound obstruction and each of the plurality of second portions being unquilted to provide primarily sound absorption; and
   a frame, the sound absorbing layer and the sound insulating layer secured to the frame, the frame providing structural support and shape to the sound absorbing layer and the sound insulating layer.

2. The acoustic fiber silencer of claim 1, wherein the frame comprises at least one interior cross-member to provide additional support, wherein the cross-member overlaps in plan view at least one of the plurality of second portions.

3. The acoustic fiber silencer of claim 1, wherein the fibrous material of the sound absorbing layer and/or the sound insulating layer comprises a batting or mat made of polyethylene terephthalate (PET) fibers, polypropylene (PP) fibers, or a combination thereof.

4. The acoustic fiber silencer of claim 1, wherein the sound absorbing layer and the sound insulating layer comprise aligned cutouts for the passage of motor vehicle components through the acoustic fiber silencer.

5. The acoustic fiber silencer of claim 1, wherein the frame further comprises barrier portions in areas where noise transmission levels are high for providing additional sound obstruction.

6. The acoustic fiber silencer of claim 1, further comprising an additional sound absorbing layer formed of a fibrous batt, foamed plastic material, or other relatively low density, porous sound-absorbing material.

7. An acoustic fiber silencer for a motor vehicle, the acoustic fiber silencer comprising:
   a sound absorbing layer of a fibrous material;
   a sound insulating layer of a fibrous material, the sound insulating layer comprising at least one first portion and a plurality of second portions, the at least one first portion being quilted via pinching the fibrous material via pressure and/or heat in pattern to increase air flow resistivity and provide primarily sound obstruction and each of the plurality of second portions being unquilted to provide primarily sound absorption; and
   a frame, the sound absorbing layer and the sound insulating layer secured to the frame, the frame providing structural support and shape to the first sound absorbing layer and the sound absorbing layer, wherein the frame overlaps in plan view a first of the plurality of second portions and does not overlap in plan view a second of the plurality of second portions.

8. The acoustic fiber silencer of claim 7, wherein the frame comprises at least one interior cross-member to provide additional support, wherein the cross-member overlaps in plan view the first of the plurality of second portions.

9. The acoustic fiber silencer of claim 7, wherein the fibrous material of the sound absorbing layer and/or the sound insulating layer comprises a batting or mat made of polyethylene terephthalate (PET) fibers, polypropylene (PP) fibers, or a combination thereof.

10. The acoustic fiber silencer of claim 7, wherein the sound absorbing layer and the sound insulating layer comprise aligned cutouts for the passage of motor vehicle components through the acoustic fiber silencer.

11. The acoustic fiber silencer of claim 7, wherein the frame further comprises barrier portions in areas where noise transmission levels are high for providing additional sound obstruction.

12. The acoustic fiber silencer of claim 7, further comprising an additional sound absorbing layer formed of a fibrous batt, foamed plastic material, or other relatively low density, porous sound-absorbing material.

13. An acoustic fiber silencer for a motor vehicle, the acoustic fiber silencer comprising:
   a sound absorbing layer of a fibrous material;
   a sound insulating layer of a fibrous material, the sound insulating layer comprising at least one first portion and a plurality of second portions, the at least one first portion being quilted via pinching the fibrous material via pressure and/or heat in pattern to increase air flow resistivity and provide primarily sound obstruction and each of the at least one second portions being unquilted to provide primarily sound absorption; and
   a frame, the sound absorbing layer and the sound insulating layer secured to the frame, the frame providing structural support and shape to the sound absorbing layer and the sound insulating layer, wherein the frame further comprises at least one barrier portion that provides additional sound obstruction positioned in plan view closer to at least one of the plurality of second portions than the frame without the at least one barrier portion.

14. The acoustic fiber silencer of claim 13, wherein the frame comprises at least one interior cross-member to provide additional support, wherein the cross-member overlaps in plan view at least one of the plurality of second portions.

15. The acoustic fiber silencer of claim 13, wherein the fibrous material of the sound absorbing layer and/or the sound insulating layer comprises a batting or mat made of polyethylene terephthalate (PET) fibers, polypropylene (PP) fibers, or a combination thereof.

16. The acoustic fiber silencer of claim 13, wherein the sound absorbing layer and the sound insulating layer comprise aligned cutouts for the passage of motor vehicle components through the acoustic fiber silencer.

17. The acoustic fiber silencer of claim 13, further comprising an additional sound absorbing layer formed of a fibrous batt, foamed plastic material, or other relatively low density, porous sound-absorbing material.

\* \* \* \* \*